United States Patent [19]
Lancaster et al.

[11] Patent Number: 5,876,007
[45] Date of Patent: Mar. 2, 1999

[54] CONTAINER HOLDER

[75] Inventors: Kelly A. Lancaster, Wyoming; Marc R. Cogswell, Grand Rapids, both of Mich.

[73] Assignee: The Leslie Metal Arts Co., Inc., Grand Rapids, Mich.

[21] Appl. No.: 74,885

[22] Filed: May 8, 1998

[51] Int. Cl.⁶ ................................................. A47K 1/08
[52] U.S. Cl. ....................... 248/311.2; 224/281; 224/926; 297/188.17
[58] Field of Search .......................... 248/311.2; 224/926, 224/281, 282, 483; 297/188.15, 188.16, 188.17, 188.19

[56] References Cited

U.S. PATENT DOCUMENTS

| | | | |
|---|---|---|---|
| 4,953,771 | 9/1990 | Fischer et al. | 248/311.2 X |
| 4,981,277 | 1/1991 | Elwell | 248/311.2 |
| 5,104,184 | 4/1992 | Kwasnik et al. | 248/311.2 X |
| 5,259,580 | 11/1993 | Anderson et al. | 248/311.2 |
| 5,284,314 | 2/1994 | Misaras et al. | 248/311.2 |
| 5,297,767 | 3/1994 | Miller et al. | 248/311.2 |
| 5,330,146 | 7/1994 | Spykerman | 248/311.2 |
| 5,487,519 | 1/1996 | Grabowski | 248/311.2 |
| 5,489,054 | 2/1996 | Schiff | 224/281 |
| 5,527,008 | 6/1996 | Schutter et al. | 248/311.2 |
| 5,628,486 | 5/1997 | Rossman et al. | 248/311.2 |
| 5,692,658 | 12/1997 | Fischer et al. | 224/281 |
| 5,749,554 | 5/1998 | Avila et al. | 248/311.2 |

*Primary Examiner*—Ramon O. Ramirez
*Attorney, Agent, or Firm*—Rader, Fishman, Grauer & McGarry

[57] ABSTRACT

A container holder is provided which comprises a housing with a drawer having a container receiving recess. The drawer is mounted within the housing for movement between a stored position and a use position. An arm is mounted to the drawer for movement between a retracted position and an extended position and has a first portion which cooperates with the recess to define a container-receiving area of varying size. The arm can be selectively engaged with the drawer for retaining the arm in a number of adjustable positions between the retracted and the extended positions. The arm can be moved bi-directionally between the extended and retracted positions to releasably retain the arm in one of several discrete positions. The detent mechanism has a release leg adapted to contact the housing as the drawer is moved from the extended position to the retracted position to disengage the detent mechanism from the second portion of the arm. A bail for the container holder which is mounted to the housing so that the forward portion of the bail is lifted from a depending position to a retracted position as the drawer is moved into the housing.

47 Claims, 4 Drawing Sheets

CONTAINER HOLDER

BACKGROUND OF THE INVENTION

1. Field of the Invention

This invention relates to a container holder for a vehicle interior and, more specifically, to a vehicle container holder with a pair of adjustable container-receiving arms which are selectively positionable in one of several discrete positions. In another of its aspects, the invention relates to a vehicle container holder movably mounted in a housing and having a bail which is movable to a retracted position as the container holder is moved within the housing.

2. Description of the Related Art

Container holders in an automobile are commonplace in contemporary vehicles. The container holders are used to store a beverage container so that the vehicle operator can operate the vehicle without concern over the spilling of the container. Consequently, a number of devices have been developed for retaining and supporting beverage containers used in automobiles.

Several prior patents disclose trays which may be slidably mounted below an automobile dashboard for movement between a retracted storage position below the dashboard and an extended position for use above or close to the leading edge of the front passenger seat. Such trays may be provided with fixed circular apertures for receiving beverage containers. Examples of these devices are disclosed in U.S. Pat. No. 2,825,611, issued Mar. 4, 1958, U.S. Pat. No. 3,606,112, issued Sep. 20, 1971, and U.S. Pat. No. 3,899,982, issued Aug. 19, 1975.

Other references disclose trays which may be swingably mounted below an automobile dashboard for movement between a storage position below the dashboard and position of use extending from the dashboard toward the seat. These trays also may be provided with fixed circular apertures for receiving beverage containers. Examples of the latter devices are disclosed in U.S. Pat. No. 3,772,934, issued Dec. 4, 1956, and U.S. Pat. No. 3,190,241, issued Jun. 22, 1965.

These prior art trays which support and retain beverage containers have complete and fixed circular apertures arranged in a side-by-side or front-to-back relation. This arrangement necessarily requires that the width or depth, respectively, of the tray be greater than the diameter of two beverage containers to allow enough area to enclose a pair of fixed, complete circular apertures. Such devices obviously occupy considerable space below the vehicle dashboard.

More recent container holders have included a drawer or tray slidably mounted within the dashboard or armrest of the vehicle. The drawer or tray has semicircular openings forming a portion of a cup receiving area and arcuate arms completing the cup receiving area. Many of these container holders have arms which are biased inwardly toward the drawer and which can be moved outwardly from an initial minimum position to an enlarged position to receive a cup of larger diameter than the cup receiving area. Examples of these cup holders are U.S. Pat. No. 5,259,580, issued Nov. 9, 1993 and U.S. Pat. No. 4,953,771, issued Sep. 4, 1990. Similarly, other cup holders have a cup receiving area formed by a body portion having semicircular openings and an arm which is biased to a closed or retracted position. These cup holders are expandable from a minimum size to a larger size by forcing the cup into the cup receiving area and moving the arm opposite the direction that it is biased. See U.S. Pat. No. 5,131,716, issued Jul. 21, 1992, U.S. Pat. No. 5,104,184, issued Apr. 14, 1992, U.S. Pat. No. 5,190,259, issued Mar. 2, 1993, and commonly-assigned U.S. Pat. No. 5,527,008, issued Jun. 18, 1996. The Lescoa '008 patent discloses a container holder having an arm which is pivotable to one of several discrete positions through a ratchet-type detent mechanism.

However, the prior art container holders have several limitations. First, the arms and perhaps a bail must be cammed into a retracted position as the drawer is moved into the housing against the bias of the springs which urge the arms outwardly therefrom, often causing scratching and other damage to exterior surfaces of the container holder and requiring a degree of force to move the container holder into the housing. Second, prior art container holders are often positionable in only one direction, i.e., container holder arms are always initially positioned in an outermost position and must be selectively positioned inwardly to achieve a desired intermediate position.

SUMMARY OF THE INVENTION

A container holder is provided which comprises a housing having a front and a back, the front of the housing defining an opening, and a drawer having a container receiving recess. The drawer is mounted within the housing opening for movement between a stored position in which the recess is disposed within the housing and a use position in which the recess extends beyond the front of the housing. An arm is mounted to the drawer for movement between a retracted position proximate the recess and an extended position distal the recess and has a first portion with a complementary shape to the recess to define with the recess a container-receiving area of varying size. The arm further has a detent portion and a detent mechanism is mounted to the drawer and is engageable with the detent portion of the arm for selectively retaining the arm in a number of adjustable positions between the retracted and the extended positions.

In one aspect, the invention relates to an improved container holder wherein the detent mechanism comprises a detent leg pivotally mounted to the drawer. One of the detent leg and the detent portion of the arm has a series of indentations and the other of the detent leg and the detent portion of the arm has a detent end which fits within each of the indentations. The second portion of the arm abuts the detent leg and a spring biases the detent leg toward the second portion of the arm to selectively retain the detent end within one of the indentations. The arm can thereby be moved bi-directionally toward one of the extended and retracted positions and releasably retain the second portion of the arm in any one of the indentations.

In another aspect, the invention relates to an improved container holder wherein the detent mechanism has a release leg adapted to contact the housing as the drawer is moved from the extended position to the retracted position and to disengage the detent mechanism from the second portion of the arm.

In an additional aspect, the invention relates to an improved container holder having a bail pivotally mounted to the drawer at a bail pivot axis rearward of the drawer recess for movement of the bail between a retracted position within the drawer and depending position wherein a forward portion of the bail extends beneath the drawer and is adapted to support a container placed in the recess. The bail further comprises a rearward portion having a cam surface thereon and the housing has a cam follower thereon. The bail cam surface is adapted to contact the housing cam follower during movement of the housing between the extended position and the retracted position to lift the forward portion of the bail from the depending position to the retracted position.

The detent leg can be provided with the series of indentations and the arm detent portion can be provided with the detent end. Each of the indentations preferably is symmetrical about a central axis thereof and is shaped for sliding movement of the detent end into and out of the indentations with equal facility. The detent mechanism can further comprise a release leg rigidly mounted to the detent leg and adapted to contact the housing as the drawer is moved from the extended position to the retracted position to disengage the second portion of the arm from a corresponding indentation in the detent leg whereby the arm can pivot with respect to the drawer without being retarded by the detent leg. The release leg can further comprise a cam surface adapted to contact the front of the housing as the drawer is moved toward the retracted position from the extended position. The release leg can be positioned generally orthogonally with respect to the detent leg. A terminal end of the detent leg can comprise a shoulder which forms a stop for the movement of the second portion of the arm with respect to the detent leg. The detent leg and the release leg can be pivotally mounted to the drawer through a pin which extends through a mounting aperture in one of the detent leg and the release leg and generally adjacent to an intersection between the detent and release legs. The detent mechanism can further comprise a second spring mounted between the drawer and the arm to bias the arm to the extended position. The second spring can have a force insufficient to overcome the resistance of the detent mechanism but sufficient to bias the arm to the extended position when the detent leg is disengaged from the second portion of the arm.

The cam follower portion of the housing can define a stop which interfaces with cam surface on the bail to limit travel of the drawer with respect to the housing beyond the extended position. The housing cam follower further comprises a profiled surface for depressing the rearward portion of the bail as the drawer moves from the extended position to the retracted position. The bail cam surface has a substantially vertical portion which is adapted to abut the stop on the housing cam follower when the drawer is in the extended position. The bail cam surface has an ramped rear portion adapted to abut the profiled surface on the housing cam follower when the drawer is moved toward the retracted position.

BRIEF DESCRIPTION OF THE DRAWINGS

The invention will now be described with reference to the drawings in which.

DETAILED DESCRIPTION OF THE PREFERRED EMBODIMENTS

Figure 1:
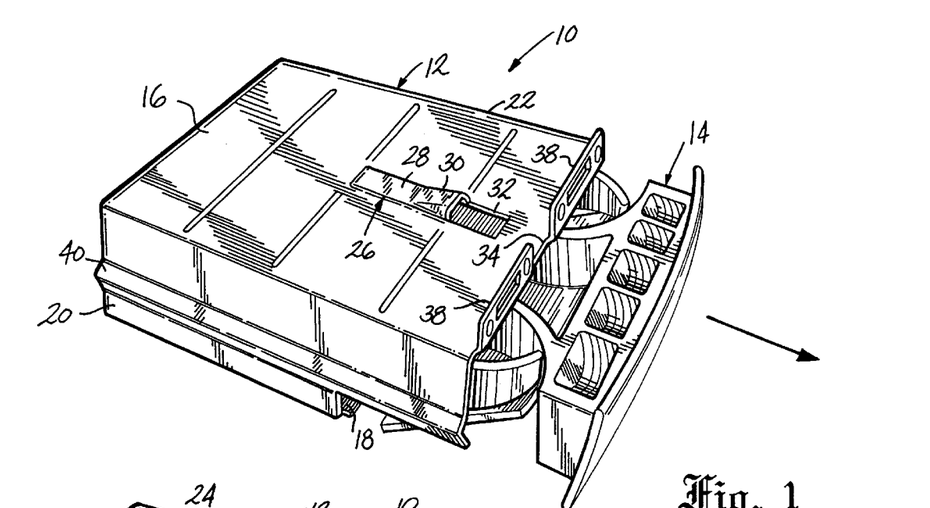
FIG. 1 is a perspective view of a container holder according to the invention shown being moved from a retracted position to an extended position within a housing.
Figure 2:
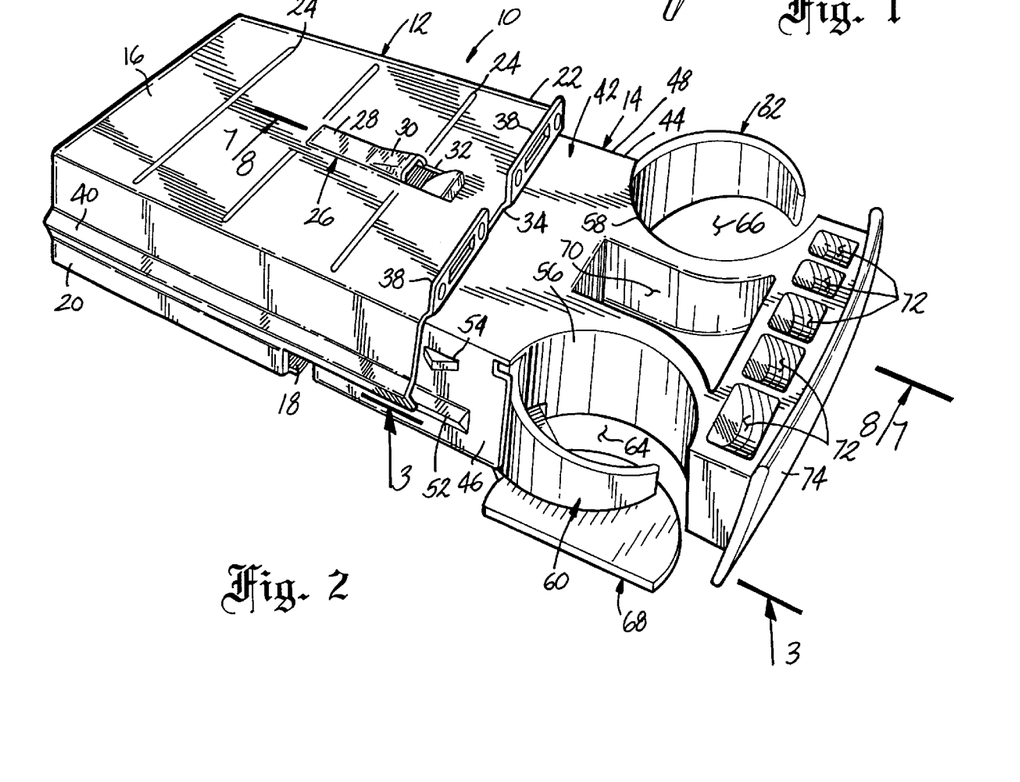
FIG. 2 is a perspective view of the container holder of FIG. 1 shown moved to an extended position whereby a detent mechanism engages a pair of container-receiving arms to selectively retain the arms at a number of discrete positions and also showing a bail which provides a base for containers received within the container holder moved to a depending position with respect to the housing.

Referring now to the drawings and to FIGS. 1–2 in particular, a container holder 10 is shown comprising a housing 12 in which a drawer 14 is mounted for movement between a retracted position within the housing 12 and an extended position as shown in FIG. 2. Unless otherwise noted, the components of the container holder 10 can be made from any suitably rigid material, such as a synthetic resin or a light-weight metal.

The housing 12 comprises a rectangular body defined by upper and lower walls 16 and 18, respectively, and opposing sidewalls 20 and 22. The upper wall 16 can include several laterally-extending reinforcing ribs 24 therein to provide additional structural integrity to the housing 12. Further, a raised ridge 26 is located in a central portion of the upper wall 16 and comprises a reduced height portion 28 which terminates in an upwardly-extending cam portion 30. An aperture 32 is axially aligned with the raised ridge 26 and extends toward a forward edge 34 of the upper wall 16. The forward edge 34 of the upper wall 16 can also be provided with one or more flanges 38 which are provided for mounting the housing 12 within a suitable recess in a vehicle interior, such as within a console, dashboard, armrest or the like.

The opposing sidewalls 20 and 22 each include a longitudinally-extending rail 40 adapted to receive a corresponding portion on the drawer 14 for movably mounting the drawer 14 within the housing 12. It will be understood that a forward portion of the housing 12 remains open as defined by forward edge 34 of the upper wall 16 and corresponding forward edges of the lower wall 18 and sidewalls 20 and 22.

The drawer 14 comprises a housing 42 shaped generally to correspond with the forward opening in the housing 12 so that the drawer 14 can be mounted therein. The housing 42 of the drawer 14 is defined by a top wall 44, sidewalls 46 and 48, and a bottom wall 50. The sidewalls 46 and 48 preferably include a longitudinal rail 52 which is arranged to cooperate with the rails 40 on the sidewalls 20 and 22 of the housing 12 so that the drawer 14 can be slidably mounted within the housing 12. The sidewalls 46 and 48 of the housing 42 also include an aperture 54 adjacent an upper, forward portion of each sidewall 46 and 48.

A forward portion of the housing 42 includes a pair of inwardly-extending semi-circular walls 56 and 58 which cooperate with a pair of arcuate arms 60 and 62 to form container-receiving areas 64 and 66, respectively. A bail 68 is pivotally mounted to the housing 42 and defines a base for a container mounted in each container-receiving areas 64 and 66.

The forward portion of the housing 42 adjacent the container-receiving areas 64 and 66 can also be provided with other desirable features, such as a storage bin 70 and several coin-receiving recesses 72 adapted to receive several vertically-oriented coins of various standard denominations as desired. Further, a decorative faceplate 74 is provided on a forward edge of the housing 42 for providing an aesthetically-pleasing appearance for the container holder 10 whether in the retracted or extended position within a vehicle interior.

According to one feature of the invention, the arms 60 and 62 are releasably retained by a detent mechanism 76 as shown in greater detail in FIGS. 3–6. The detent mechanism 76 is preferably releasable from engagement with a corresponding arm 60 and 62 so that, as the drawer 14 is moved from the extended position to the retracted position within the housing 12, the detent mechanism 76 is released from engagement with the corresponding arm 60 and 62. The arm can then pivot freely and easily move to a storage position as the drawer 14 is moved to the retracted position within the housing 12.

Although only one arm 62 is shown in FIGS. 3–6, the assembly and operation of the other arm 60 with respect to its corresponding detent mechanism 76 is identical to that of the arm 62 and its corresponding detent mechanism 76, except for being a mirror image thereof. Thus, only one of the detent mechanism 76 and arm 62 is described with the understanding that the other arm 60 and detent mechanism 76 operate in an identical manner.

The arm 62 preferably comprises an elongated member having a forward arcuate portion 78 and a rearward elongated portion 80 with a boss 81 located therebetween. The boss 81 is preferably pivotally mounted to the drawer 14 by conventional means, such as a threaded fastener, a pin, or a snap-fit mounting of a protrusion within a socket on either of the drawer 14 and the arm 62. It will be understood that the forward arcuate portion 78 of the arm 62 cooperates with the semi-circular wall 58 of the drawer 14 to define a container-receiving area 66 which can be sized depending upon the pivot positioning of the arm 62 with respect to the wall 58 to enable the container-receiving area 66 to be sized to receive any number of different beverage containers (not shown). The elongated portion 80 of the arm 62 preferably extends rearwardly from the boss 81 and includes a distal end 82 which engages the detent mechanism 76.

The detent mechanism 76 comprises a lever 84, a first spring 86 and a second spring 88. The detent mechanism 76 is preferably provided to retain the arm 62 in several discrete positions with respect to the container-receiving area 66 and which is released from engagement with the arm 62 when the drawer is moved to the retracted position within the housing 12.

Figure 5:
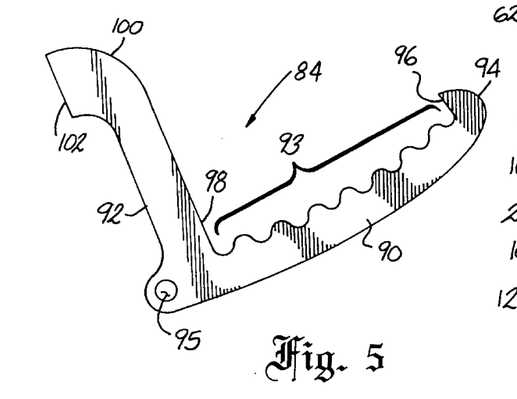
FIG. 5 is a top plan view of a lever of the releasable detent mechanism shown in FIGS. 3–4.

The lever 84 is shown in greater detail in FIG. 5 and comprises an L-shaped member defined by a first leg 90 and a second leg 92 which has a mounting aperture 95 defined adjacent to the intersection of the legs 90 and 92. The first leg 90 comprises an elongated member having an interior edge provided with several detents 93 and a terminal end 94 provided with a shoulder 96 thereon. It will be understood that the shoulder 96 and an interior surface 98 of the second leg 92 define outer and inner limits, respectively, for travel of the arm 62 with respect to the lever 84. The second leg 92 is preferably arranged generally perpendicularly with respect to the first leg 90 and includes a distal end 100 provided with a laterally-extending tab 102 which preferably has a ramped or cam surface thereon adapted to abut the housing 12 as the drawer 14 is moved into the retracted position.

The first spring 86 is preferably a resilient arm spring formed from a length of resilient material. The second spring 88 is preferably a coil spring which has a low spring constant which can be capable of providing a force as minimally necessary to pivot the arm 62 when the detent mechanism 76 is disengaged therefrom. It will be understood that the first and second springs 86 and 88 can also comprise any known biasing member without departing from the scope of this invention.

The lever 84 is pivotally mounted to the drawer 14 by a fastener 104, such as a pin retained in upper and lower walls 44 and 50, respectively, of the drawer 14 to pivotally mount the lever 84 to the drawer 14. The arm spring 86 is preferably mounted to a rear wall 106 of the drawer 14 and is outwardly biased with respect thereto so that the first spring 86 abuts the first leg 90 of the lever 84 opposite from the detents 93. The lever 84 is thereby biased in a counterclockwise direction in the orientation shown in the drawings so that the distal end 100 and its associated tab 102 are biased outwardly from the aperture 54 in the sidewall 48 of the drawer 14.

In this biased position, the distal end 82 of the arm 62 is received within a particular detent 93 between the outer and inner ends 96 and 98 of the first leg 90 to selectively retain the arm 62 in a particular discrete location with respect to the drawer 14. The detents 93 have surfaces arranged so that the distal end 82 of the arm 62 is reliably retained within a particular detent 93, but can be pivoted by a user to a different detent 93 without undue torque applied to the arm 62.

The second spring 88 is preferably interconnected between the drawer 14 and the elongated portion 80 of the arm 62. The first spring 86 biases the first leg 90 against the distal end 82 of the arm 62 so that the distal end 82 is retained within a particular detent 93 and that the second spring 88 is only effective when the lever 84 is pivoted out of engagement with the arm 62.

Figure 3:
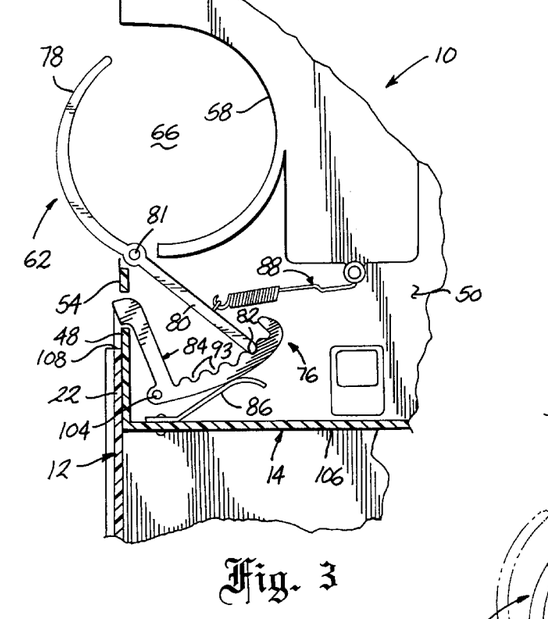
FIG. 3 is a fragmentary, cross-sectional view taken along lines 3—3 of FIG. 2 showing a releasable and bi-directional detent mechanism engaging a container-receiving arm of the container holder according to the invention.
Figure 4:
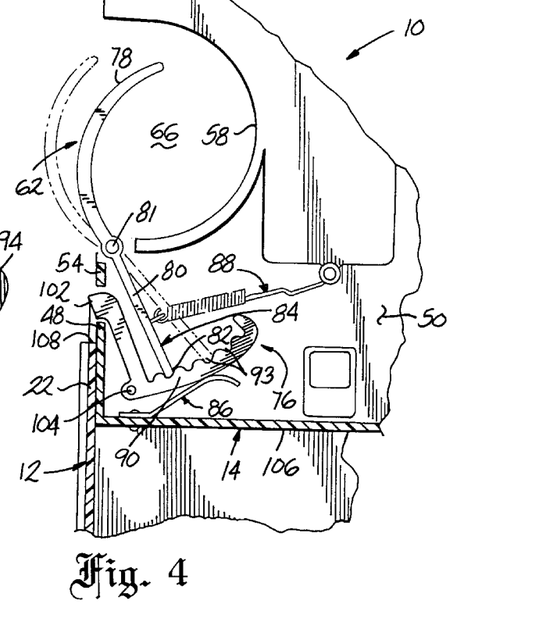
FIG. 4 is a fragmentary, cross-sectional view taken along lines 3—3 of FIG. 2 showing the container-receiving arm positionable at a number of intermediate positions with respect to a container holder housing.

FIG. 3 shows the arm 62 positioned in an extended position relative to the sidewall 58 of the drawer 14. FIG. 4 shows the arm pivoted from the extended position, shown in phantom outline form, toward a retracted position whereby the arm 62 is pivoted inwardly with respect to the sidewall 58 of the drawer 14 as shown by the solid lines in the drawing. The distal end 82 of the arm 62 is then retained in a detent 93 toward the interior edge 98 of the second leg 92. Thus, the container-receiving area 66 defined by the arm 62 and the sidewall 58 of the drawer 14 is configured to receive a smaller beverage container as desired. It is also a feature of this invention that the arm can be returned to one of the extended positions merely by urging the arcuate portions 78 of the arm 62 outwardly with respect to the drawer 14 so that the arm 62 is positionable bi-directionally with respect to the drawer 14.

In any event, when the arm 62 is moved relative to the sidewall 58 of the drawer 14, the distal end 82 of the arm 62 rides up a particular wall of a detent 93, biases the first spring 86 inwardly, and travels into the next successive detent 93. Once the distal end 82 enters into the next successive detent 93, the first spring 86 biases the particular detent of the first leg 90 against the elongated portion 82, thereby retaining the arm 62 in the new desired position defined by the next successive detent 93.

Figure 6:
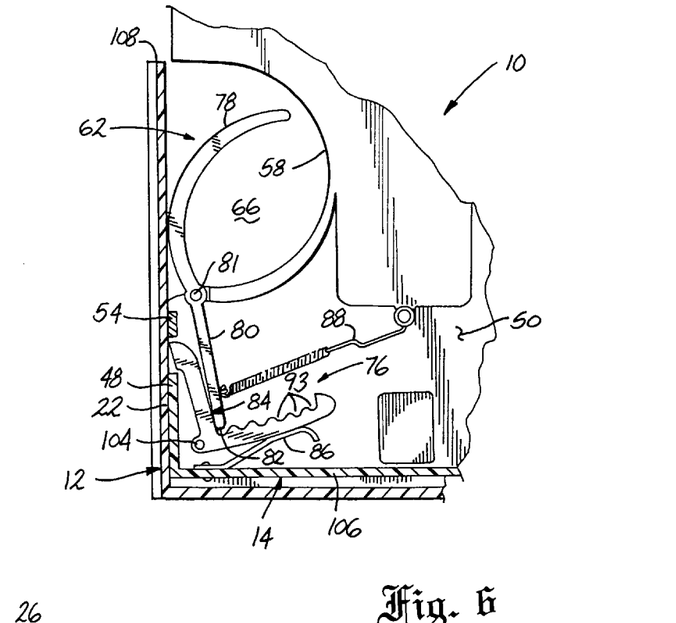
FIG. 6 is a fragmentary, cross-sectional view taken along lines 3—3 of FIG. 2 showing the container holder moved to a retracted position within the housing whereby the detent mechanism has been released from engagement with the container-receiving arm.

It is also an important feature of this invention that the detent mechanism 76 is disengaged from the arm 62 when the drawer 14 is moved from the extended position to the retracted position within the housing 12. In the extended position, the distal end 100, and more importantly, the tab 102 thereon, is biased by the first spring 86 out of the aperture 54 and the sidewall 48 of the drawer 14.

As the drawer 14 is moved from the extended position to the retracted position within the housing 12, the tab 102 on the distal end 100 of the lever 84 contacts a forward edge 108 of the sidewall 22 of the housing 12. The ramped configuration of the tab 102 causes it to ride against the forward edge 108 of the housing 12 and urge the distal end 100 of the lever 84 within the aperture 54 of the sidewall 48 of the drawer 14. This causes the lever 84 to be pivoted clockwise (in the orientation shown in the drawings) against the bias of the first spring 86.

As shown in greater detail in FIG. 6, once the distal end 100 of the lever 84 is fully received within the aperture 54, the detents 93 on the first leg 90 are pivoted out of contact with the distal end 82 of the arm 62. Thus, the amount of force needed to pivot the arm 62 only requires overcoming the tension in the second spring 88, rather than the much higher force needed to overcome the frictional engagement of the distal end 82 of the arm 62 within a particular detent 93 as biased therein by the first spring 86.

As the drawer 14 is continued toward the retracted position within the housing 12, the forward edge 108 of the sidewall 22 of the housing 12 abuts the arm 62 and requires very little force to urge the arcuate portion 78 of the arm 62 toward the sidewall 58 of the drawer 14 to move the arm 62 to the storage position adjacent the sidewall 58 as shown in FIG. 6.

Conversely, as the drawer 14 is extended from the retracted position within the housing 12, the tab 102 is biased against an interior surface of the sidewall 22 of the housing 12 by the first spring 86. As the tab 102 of the distal end 100 of the lever 84 rides against the interior surface of the sidewall 22 of the housing 12, the distal end 82 of the arm 62 remains out of contact with the first leg 90 of the lever 84 and, thus, not retained within a detent 93 of the lever 84. The second spring 88 provides a counterclockwise bias to the arm 62 (in the orientation shown in the drawings). As the arcuate portion 78 clears the forward edge 108 of the sidewall 22 of the housing 12, the second spring 88 pivots the arm 62 in a counterclockwise direction. Thus, when the drawer 14 is initially moved to the fully extended position with respect to the housing 12, the arm 62 is positioned in a fully extended position and is ready to receive a container in the container-receiving area 66.

As the drawer 14 is initially moved to the extended position with respect to the housing 12, the tab 102 of the distal end 100 of the lever 84 also clears the forward edge 108 of the sidewall 22 of the housing 12. The bias of the first spring 86 causes the lever 84 to pivot in a counterclockwise direction and extend through the aperture 54 in the sidewall 48 of the drawer 14 once the interior surface of the sidewall 22 of the housing 12 does not obstruct the aperture 54. One of the detents 93 on the first leg 90 of the lever 84 and, more specifically, the outermost detent 93 adjacent the distal end 94 of the first leg 90, is returned to engagement with the distal end 82 of the arm 62 as a result of the bias of the first spring 86. A user can select a different position of the arm 62 relative to the sidewall 58 of the drawer 14 to vary the size of the container-receiving area 66 in the manner previously described.

Because container holders of this type are often made from synthetic resin materials having a dark pigment thereto, prior art container holders often scratched the outer surface of the container-receiving arms as the container holder is moved between retracted and extended positions because the user was required to overcome the bias of a high-tension spring contained in the container holder to cam the container-receiving arms to a storage position.

In the container holder 10 of this invention, the first spring 86 and its associated detent 93 of the detent mechanism 76 is released from engagement with the arm 62 prior to the housing 12 contacting the arm 62 as a result of the abutment of the tab 102 of the lever 84 against the forward edge 108 of the housing 12. Thus, very little force is required to pivot the arm 62 to a storage position by the camming action of the forward edge 108 of the sidewall 22 of the housing 12 against the arm 62 during movement of the drawer 14 relative to the housing 12.

Figure 7:
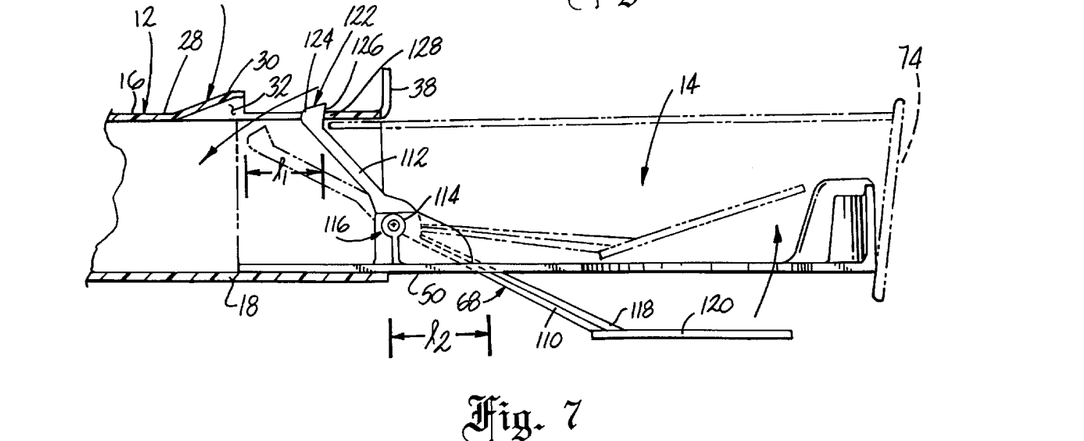
FIG. 7 is a longitudinal, cross-sectional view taken along lines 7—7 of FIG. 2 showing a bail for the container holder moved between an extended position shown in solid lines and a retracted position shown in phantom lines as the container holder is moved from an extended position into a retracted position within the housing.
Figure 8:
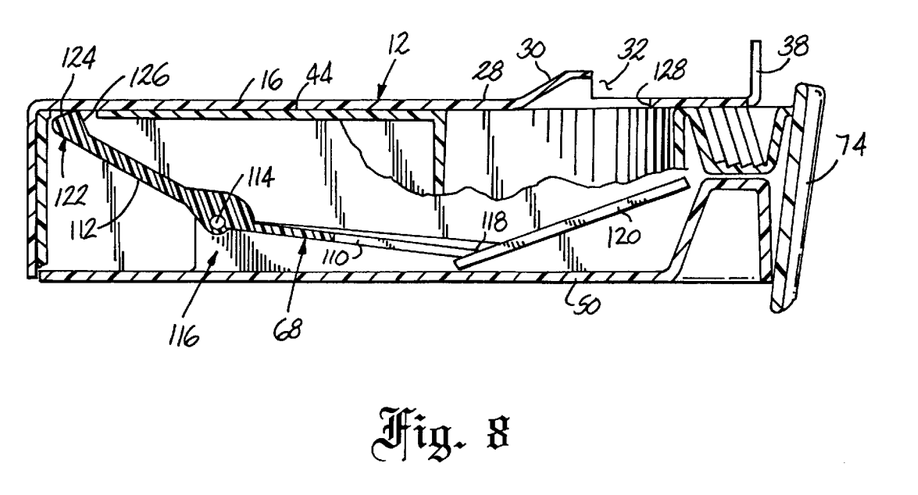
FIG. 8 is a longitudinal, cross-sectional view taken along lines 8—8 of FIG. 2 showing the bail of the container holder completely retracted within the housing when the container holder is positioned in the retracted position in the housing.

As shown in FIGS. 7–8, the bail 68 is also pivotally mounted to the drawer 14 and interacts with the housing 12 during movement of the drawer 14 relative to the housing 12 so that the bail 68 is lifted to a retracted position prior to contacting the housing 12 as the drawer 14 is moved to the retracted position therein. The movement of the bail 68 prior to contacting the housing 12 also prevents damage to the bail and the housing 12 and reduces the force necessary to move the drawer 14 with respect to the housing 12.

The bail 68 comprises a first leg 110 and a second leg 112 with a boss 114 located therebetween for pivotally mounting the bail 68 to the drawer 14. It will be understood that the drawer 14 includes a pivotal mounting flange 116 which extends upwardly from the floor 50 of the drawer 14 which receives the boss 114 of the bail 68 in any conventional manner.

The first leg 110 of the bail 68 preferably includes a distal end 118 having a cantilevered panel 120 thereon which preferably corresponds in part to the profile of the container-receiving areas 64 and 66 defined by the drawer 14. It will be understood that the base of a container placed within one of the container-receiving areas 64 and 66 rests on the panel 120 of the first leg 110 of the bail 68 when the drawer 14 is in the extended position relative to the housing 12.

The second leg 112 of the bail 68 preferably comprises an elongated shaft having a distal end 122 provided with a leading cam surface 124 and a trailing cam surface 126 thereon. The cam surfaces 124 and 126 are preferably disposed at an acute angle with respect to one another for defining the intermost and outermost limits of rotational travel of the bail 68 with respect to the drawer 14 during movement of the drawer 14 with respect to the housing 12.

FIG. 7 shows the drawer 14 in the extended position with respect to the housing 12 and the bail 68 is shown in solid lines. As can be seen in FIG. 7, the trailing cam surface 126 of the second end 122 of the bail 68 abuts a forward edge 128 of the aperture 32 defined in the top wall 16 of the housing 12. Thus, the abutment of the trailing cam surface 126 against the forward edge 128 of the aperture 32 defines the clockwisemost limit of travel of the bail 68. Thus, as a beverage container base is placed upon the panel 120 of the bail 68, any further clockwise pivoting of the bail 68 is prevented by the abutment of the trailing cam surface 126 against the forward edge 128 of the aperture 32 in the housing 12 so that the panel 120 securely supports the container base.

The first and second legs 110 and 112, respectively, of the bail 68 are configured so that the distal end 122 of the second leg 112 abuts the cam surface 30 on the ridge 26 before the first leg 110 abuts the bottom wall 18 of the housing 12. As the drawer 14 is moved to the retracted position within the housing 12, the distal end 122 and, more specifically, the leading cam surface 124 thereof, contacts the interior surface of the cam surface 30 of the housing 12. Thus, a horizontal distance $l_1$ between the distal end 122 of the bail 68 and the cam surface 30 of the indentation 26 in the top wall 16 of the housing 12 is preferably less than a horizontal distance $l_2$ between the first leg 110 of the bail 68 and the bottom wall 18 of the housing 12 as shown in FIG. 7. As the leading cam surface 124 of the distal end 122 contacts the interior surface of the cam surface 30, the abutment therebetween causes the cam surface 30 to urge the distal end 122 in a counterclockwise direction, thus pivoting the bail 68 to the retracted position shown in phantom outline form in FIG. 7 before the first leg 110 contacts the housing 12.

Once the leading surface 124 of the distal end 122 of the bail 68 rides along the cam surface 30, the distal end 122 of the bail 68 rides along an interior surface of the top wall 16 of the housing 12 as the drawer 14 is moved to the retracted position within the housing 12. When the drawer 14 is moved to the fully retracted position, the bail 68 is stored within the drawer 14 in the housing 12 in the position shown in FIG. 8.

Conversely, as the drawer 14 is moved to the extended position with respect to the housing 12, the bail 68 pivots clockwise (in the orientation shown in FIGS. 7–8) so that the panel 120 thereof falls to a depending position below the drawer 14 into position to receive the base of a container placed within the corresponding container-receiving area 64 or 66. As the bail 68 moves to the depending position, the trailing cam surface 126 once again abuts the forward edge 128 of the aperture 32 of the housing 12.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments for which an exclusive property or privilege is claimed are defined as follows:

1. A container holder comprising:
   a housing having a front and a back, the front of the housing defining an opening;
   a drawer having a container receiving recess, the drawer mounted within the housing opening for movement between a stored position in which the recess is disposed within the housing and a use position in which the recess extends beyond the front of the housing;
   an arm mounted to the drawer for movement between a retracted position proximate the recess and an extended position distal the recess and having a first portion with a complementary shape to the recess to define with the recess a container-receiving area of varying size, the arm further having a detent portion;
   a detent mechanism mounted to the drawer and engageable with the detent portion of the arm for selectively retaining the arm in a number of adjustable positions between the retracted and the extended positions;
   the improvement comprising:
   the detent mechanism comprises a detent leg pivotally mounted to the drawer;
   one of the detent leg and the detent portion of the arm having a series of indentations and the other of the detent leg and the detent portion of the arm having a detent end which fits within each of the indentations;
   the second portion of the arm abuts the detent leg; and
   a spring biases the detent leg toward the second portion of the arm to selectively retain the detent end within one of the indentations;
   whereby the arm can be moved bi-directionally toward one of the extended and retracted positions and releasably retain the second portion of the arm in any one of the indentations.

2. The container holder of claim 1 wherein the detent leg has a series of indentations and the arm detent portion has the detent end.

3. The container holder of claim 2 wherein each of the indentations is symetrical about a central axis thereof and is shaped for sliding movement of the detent end into and out of the indentations with equal facility.

4. The container holder of claim 3 wherein the detent mechanism further comprises a release leg rigidly mounted to the detent leg and adapted to contact the housing as the drawer is moved from the extended position to the retracted position to disengage the second portion of the arm from a corresponding indentation in the detent leg whereby the arm can pivot with respect to the drawer without being retarded by the detent leg.

5. The container holder of claim 4 wherein the release leg further comprises a cam surface adapted to contact the front of the housing as the drawer is moved toward the retracted position from the extended position.

6. The container holder of claim 5 wherein the release leg is positioned generally orthogonally with respect to the detent leg.

7. The container holder of claim 6 wherein a terminal end of the detent leg comprises a shoulder which forms a stop for the movement of the second portion of the arm with respect to the detent leg.

8. The container holder of claim 7 wherein the detent leg and the release leg are pivotally mounted to the drawer through a pin which extends through a mounting aperture in one of the detent leg and the release leg and generally adjacent to an intersection between the detent and release legs.

9. The container holder of claim 8 wherein the detent mechanism further comprises a second spring mounted between the drawer and the arm to bias the arm to the extended position.

10. The container holder of claim 9 wherein the second spring has a force insufficient to overcome the resistance of the detent mechanism but sufficient to bias the arm to the extended position when the detent leg is disengaged from the second portion of the arm.

11. The container holder of claim 10 and further comprising a bail pivotally mounted to the housing for movement between a retracted position within the drawer and a depending position wherein a portion of the bail extends beneath the drawer and is adapted to support a container placed in the recess.

12. The container holder of claim 11 wherein the bail further comprises a rearward portion having a cam surface thereon, the housing has a cam follower portion thereon, the bail cam surface is adapted to contact the housing cam follower during movement of the housing between the extended position and the retracted position to lift the forward portion of the bail from the depending position to the retracted position.

13. The container holder of claim 1 wherein a terminal end of the detent leg comprises a shoulder which forms a stop for the movement of the second portion of the arm with respect to the detent leg.

14. The container holder of claim 1 wherein the detent mechanism further comprises a release leg wherein the detent leg and the release leg are pivotally mounted to the drawer through a pin which extends through a mounting aperture in one of the detent leg and the release leg and generally adjacent to an intersection between the detent and release legs.

15. The container holder of claim 1 wherein the detent mechanism further comprises a second spring mounted between the drawer and the arm to bias the arm to the extended position.

16. The container holder of claim 15 wherein the second spring has a force insufficient to overcome the resistance of the detent mechanism but sufficient to bias the arm to the extended position when the detent leg is disengaged from the second portion of the arm.

17. The container holder of claim 1 and further comprising a bail pivotally mounted to the housing for movement between a retracted position within the drawer and a depending position wherein a portion of the bail extends beneath the drawer and is adapted to support a container placed in the recess.

18. The container holder of claim 17 wherein the bail further comprises a rearward portion having a cam surface thereon, the housing has a cam follower portion thereon, the bail cam surface is adapted to contact the housing cam follower during movement of the housing between the extended position and the retracted position to lift the forward portion of the bail from the depending position to the retracted position.

19. The container holder of claim 1 wherein each of the indentations is symetrical about a central axis thereof and is shaped for sliding movement of the detent end into and out of the indentations with equal facility.

20. The container holder of claim 1 wherein the detent mechanism further comprises a release leg rigidly mounted to the detent leg and adapted to contact the housing as the drawer is moved from the extended position to the retracted position to disengage the second portion of the arm from a corresponding indentation in the detent leg whereby the arm can pivot with respect to the drawer without being retarded by the detent leg.

21. A container holder comprising:
a housing having a front and a back, the front of the housing defining an opening;
a drawer having a recess, the drawer mounted within the housing opening for movement between a stored position where the recess is disposed within the housing and a use position where the recess extends beyond the front of the housing;
an arm mounted to the drawer having a first portion in complementary relationship with the recess and a second portion for movement between a retracted position within the recess to an extended position so that the recess and the arm define a container-receiving area of varying size;
a detent mechanism mounted to the drawer and engageable with the second portion of the arm for selectively retaining the arm in a number of adjustable positions between the retracted and the extended positions;
the improvement comprising:
the detent mechanism has a release leg adapted to contact the housing as the drawer is moved from the extended position to the retracted position and to disengage the detent mechanism from the second portion of the arm.

22. The container holder of claim 21 wherein the detent mechanism comprises:
a pivotally mounted detent leg having a series of indentations;
the second portion of the arm abuts the detent leg; and
a spring biases the detent leg toward the second portion of the arm to selectively retain the second portion of the arm within one of the indentations.

23. The container holder of claim 22 wherein the detent mechanism further comprises a release leg rigidly mounted to the detent leg and adapted to contact the housing as the drawer is moved from the extended position to the retracted position to disengage the second portion of the arm from a corresponding indentation in the detent leg whereby the arm can pivot with respect to the drawer without being retarded by the detent leg.

24. The container holder of claim 23 wherein the release leg further comprises a cam surface adapted to contact the front of the housing as the drawer is moved toward the retracted position from the extended position.

25. The container holder of claim 24 wherein the release leg is positioned generally orthogonally with respect to the detent leg.

26. The container holder of claim 25 wherein a terminal end of the detent leg comprises a shoulder which forms a stop for the movement of the second portion of the arm with respect to the detent leg.

27. The container holder of claim 26 wherein the detent leg and the release leg are pivotally mounted to the drawer through a pin which extends through a mounting aperture in one of the detent leg and the release leg and generally adjacent to an intersection between the detent and release legs.

28. The container holder of claim 27 wherein the detent mechanism further comprises a second spring mounted between the drawer and the arm to bias the arm to the extended position.

29. The container holder of claim 28 wherein the second spring has a force insufficient to overcome the resistance of the detent mechanism but sufficient to bias the arm to the extended position when the detent leg is disengaged from the second portion of the arm.

30. The container holder of claim 29 and further comprising a bail pivotally mounted to the housing for movement between a retracted position within the drawer and a depending position wherein a portion of the bail extends beneath the drawer and is adapted to support a container placed in the recess.

31. The container holder of claim 30 wherein the bail further comprises a rearward portion having a cam surface thereon, the housing has a cam follower portion thereon, the bail cam surface is adapted to contact the housing cam follower during movement of the housing between the extended position and the retracted position to lift the forward portion of the bail from the depending position to the retracted position.

32. The container holder of claim 21 wherein a terminal end of the detent leg comprises a shoulder which forms a stop for the movement of the second portion of the arm with respect to the detent leg.

33. The container holder of claim 21 wherein the detent mechanism has a detent leg, the detent leg and the release leg are pivotally mounted to the drawer through a pin which extends through a mounting aperture in one of the detent leg and the release leg and generally adjacent to an intersection between the detent and release legs.

34. The container holder of claim 21 wherein the detent mechanism further comprises a second spring mounted between the drawer and the arm to bias the arm to the extended position.

35. The container holder of claim 34 wherein the second spring has a force insufficient to overcome the resistance of the detent mechanism but sufficient to bias the arm to the extended position when the detent leg is disengaged from the second portion of the arm.

36. The container holder of claim 21 and further comprising a bail pivotally mounted to the housing for movement between a retracted position within the drawer and a depending position wherein a portion of the bail extends beneath the drawer and is adapted to support a container placed in the recess.

37. The container holder of claim 36 wherein the bail further comprises a rearward portion having a cam surface thereon, the housing has a cam follower portion thereon, the bail cam surface is adapted to contact the housing cam follower during movement of the housing between the extended position and the retracted position to lift the forward portion of the bail from the depending position to the retracted position.

38. A container holder comprising:
   a housing having a front and a back, the front of the housing defining an opening;
   a drawer having a recess, the drawer mounted within the housing opening for movement between a stored position wherein the recess is disposed within the housing and a use position wherein the recess extends beyond the front of the housing;
   bail pivotally mounted to the drawer at a bail pivot axis rearward of the drawer recess for movement of the bail between a retracted position within the drawer and depending position wherein a forward portion of the bail extends beneath the drawer and is adapted to support a container placed in the recess;
   the improvement comprising:
      the bail further comprises a rearward portion having a cam surface thereon;
      the housing has a cam follower thereon; and
      the bail cam surface is adapted to contact the housing cam follower during movement of the housing between the extended position and the retracted position to lift the forward portion of the bail from the depending position to the retracted position.

39. The container holder of claim 38 wherein the cam follower portion defines a stop which interfaces with the bail cam surface to limit travel of the drawer with respect to the housing beyond the extended position.

40. The container holder of claim 39 wherein the housing cam follower further comprises a profiled surface for depressing the rearward portion of the bail as the drawer moves from the extended position to the retracted position.

41. The container holder of claim 40 wherein the bail cam surface has a substantially vertical portion which is adapted to abut the stop on the housing cam follower when the drawer is in the extended position.

42. The container holder of claim 41 wherein the bail cam surface has a ramped rear portion adapted to abut the profiled surface on the housing cam follower when the drawer is moved toward the retracted position.

43. The container holder of claim 42 and further comprising:
   an arm mounted to the drawer having a first portion in complementary relationship with the recess and a second portion for movement between a retracted position within the recess to an extended position so that the recess and the arm define a container-receiving area of varying size; and
   a detent mechanism mounted to the drawer and engageable with the second portion of the arm for selectively retaining the arm in a number of adjustable positions between the retracted and the extended positions.

44. The container holder of claim 38 wherein the housing cam follower portion further comprises a profiled surface for depressing the rearward portion of the bail as the drawer moves from the extended position to the retracted position.

45. The container holder of claim 38 wherein the bail cam surface has a substantially vertical portion which is adapted to abut a stop on the housing cam follower portion when the drawer is in the extended position.

46. The container holder of claim 38 wherein the bail cam surface has a ramped rear portion adapted to abut a profiled surface on the housing cam follower portion when the drawer is moved toward the retracted position.

47. The container holder of claim 38 and further comprising:
   an arm mounted to the drawer having a first portion in complementary relationship with the recess and a second portion for movement between a retracted position within the recess to an extended position so that the recess and the arm define a container-receiving area of varying size; and
   a detent mechanism mounted to the drawer and engageable with the second portion of the arm for selectively retaining the arm in a number of adjustable positions between the retracted and the extended positions.

* * * * *